United States Patent [19]
Lin

[11] Patent Number: 5,812,286
[45] Date of Patent: Sep. 22, 1998

[54] AUTOMATIC COLOR PROCESSING TO CORRECT HUE SHIFT AND INCORRECT EXPOSURE

[75] Inventor: Qian Lin, Santa Clara, Calif.

[73] Assignee: Hewlett-Packard Company, Palo Alto, Calif.

[21] Appl. No.: 521,479

[22] Filed: Aug. 30, 1995

[51] Int. Cl.$^6$ .................................................. G03F 3/08
[52] U.S. Cl. .................... 358/519; 358/520; 358/522; 382/273; 382/274
[58] Field of Search ...................... 358/520, 519, 358/522, 518, 448, 465, 447, 461, 515; 382/272, 273, 274, 167

[56] References Cited

U.S. PATENT DOCUMENTS

| | | | |
|---|---|---|---|
| 5,265,200 | 11/1993 | Edgar | 358/518 |
| 5,317,426 | 5/1994 | Hoshino | 358/519 |
| 5,347,374 | 9/1994 | Fuss et al. | 358/522 |
| 5,414,538 | 5/1995 | Eschbach | 358/522 |
| 5,450,502 | 9/1995 | Eschbach | 358/522 |

Primary Examiner—Edward L. Coles, Sr.
Assistant Examiner—Fan Lee
Attorney, Agent, or Firm—Pamela L. Kee

[57] ABSTRACT

A digital color processing method for images from scanners and digital cameras processes image data suitable for display on monitors or color hardcopies produced by digital color printers and correct hue shift and incorrect exposure based on the image content. The method automatically corrects the data based on the histogram of the acquired image normalizing the image data to correct for the hue shift and determining the gamma parameter to correct the exposure of the image.

9 Claims, 7 Drawing Sheets

(1 of 7 Drawing(s) Filed in Color)

AUTOMATIC COLOR PROCESSING TO CORRECT HUE SHIFT AND INCORRECT EXPOSURE

FIELD OF THE INVENTION

The invention is directed towards image processing and more specifically, towards correcting hue shift and incorrect exposure in scanners and digital cameras.

BACKGROUND OF THE INVENTION

In the 1940's, an integrate-to-gray method was proposed for automatically establishing processing parameters for an analog photo-finishing system. The method produces a good image if the image had many different hues from different parts of the color space. In other words, it assumes that the image has an overall gray content. For images that do not meet this condition, the results can be disappointing. For example, if the image is predominately green due to a large region of grass, the processing will make the grass yellower and paler, vastly different from the photographer's recollection.

Other processing methods have been proposed more recently for digital systems. In U.S. Pat. No. 5,062,058, Morikawa described a method of identifying the highlight and shadow points in an image from the density histogram of the RGB signals in a scanner. However, the method requires a person to select the highlight and shadow points, according to the human eye, using an input device. This inherently random process is neither automatic nor efficient. In U.S. Pat. No. 4,984,071, Yonezawa described a method of identifying the highlight and shadow points in an image form the density histograms of each RGB channel, as well as the histogram of the average density. The resulting gradation curves are used for photosensitive films and are not applicable to monitors or digital color printers.

What is desirable is a systematic method of performing color processing based on the image content. It would be of further benefit if the processed image could be displayed on a monitor or sent to a digital printer for a hardcopy output.

SUMMARY OF THE INVENTION

A digital color processing method for images from scanners and digital cameras processes image data suitable for display on monitors or color hardcopies produced by digital color printers and correct hue shift and incorrect exposure based on the image content. Starting from an image with poor contrast and color cast, the system automatically looks for the appropriate correction parameters to produce images with vivid color and good contrast.

The method automatically corrects the data based on the histogram of the acquired image. It consists of two steps. The first step is to find the bounding box of the image data in the RGB device space described in terms of highlight and shadow, and to normalize the image data. This corrects for the hue shift in the image. The second step is to find the gamma parameter for brightness control. This ensures that the image would have the correct exposure. Efficient implementation can be achieved by constructing a look-up-table from the bounding box parameters and the gamma parameters.

BRIEF DESCRIPTION OF THE DRAWINGS

This application contains color photographs.

DETAILED DESCRIPTION OF THE PREFERRED EMBODIMENTS

Figure 1:
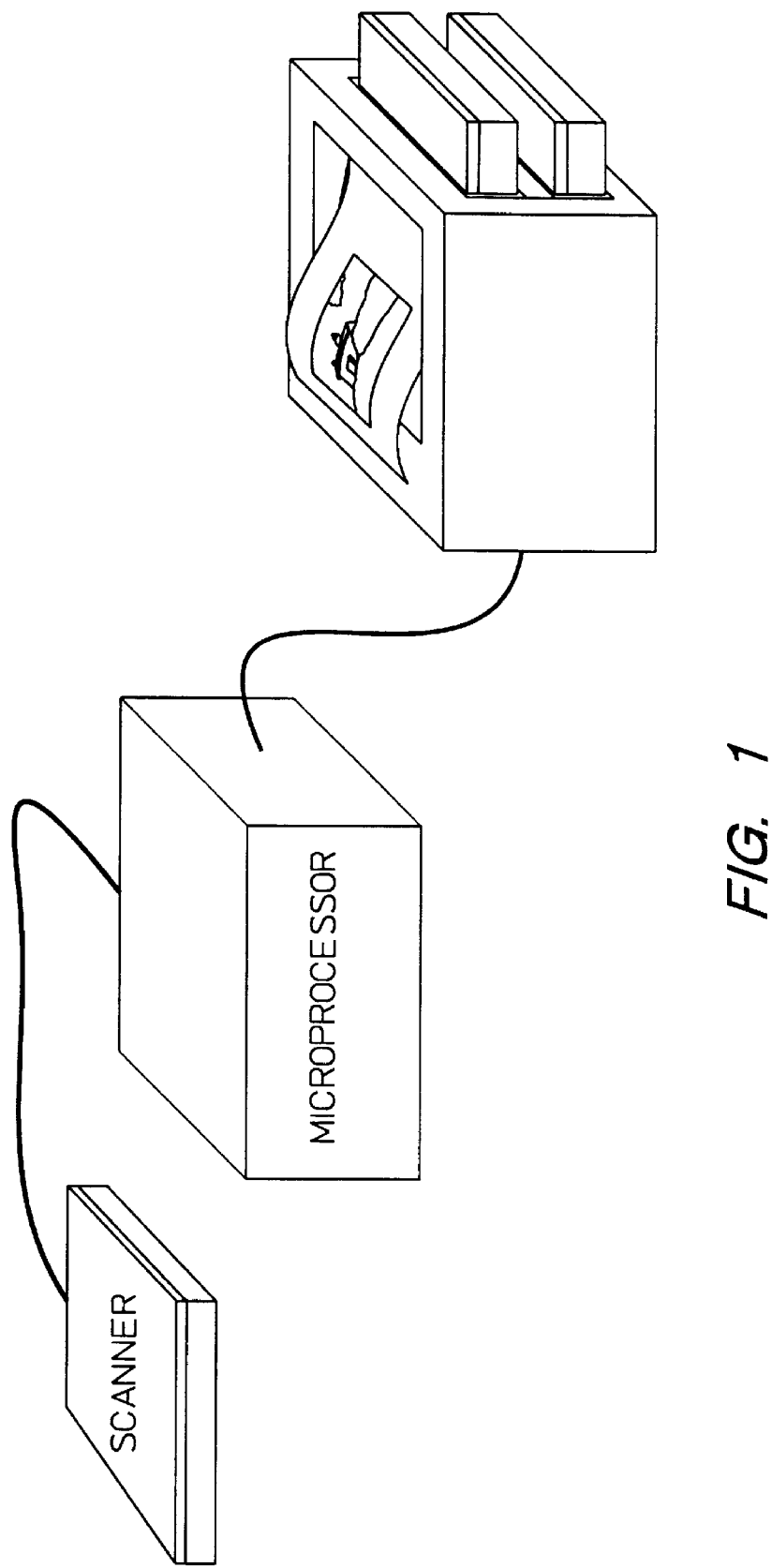
FIG. 1 illustrates a system for automatic color processing to correct hue shift and incorrect exposure in image data.

FIG. 1 illustrates a system for automatic color processing to correct hue shift and incorrect exposure in image data. A digital scanner is connected to a microprocessor that is also connected to a printer. A digital processor, contained in the microprocessor or within the digital scanner, processes the image data to correct for hue shift and incorrect exposure.

Although a digital scanner is used, an uninverted digital camera image or photo CD image may also be used.

Figure 2:
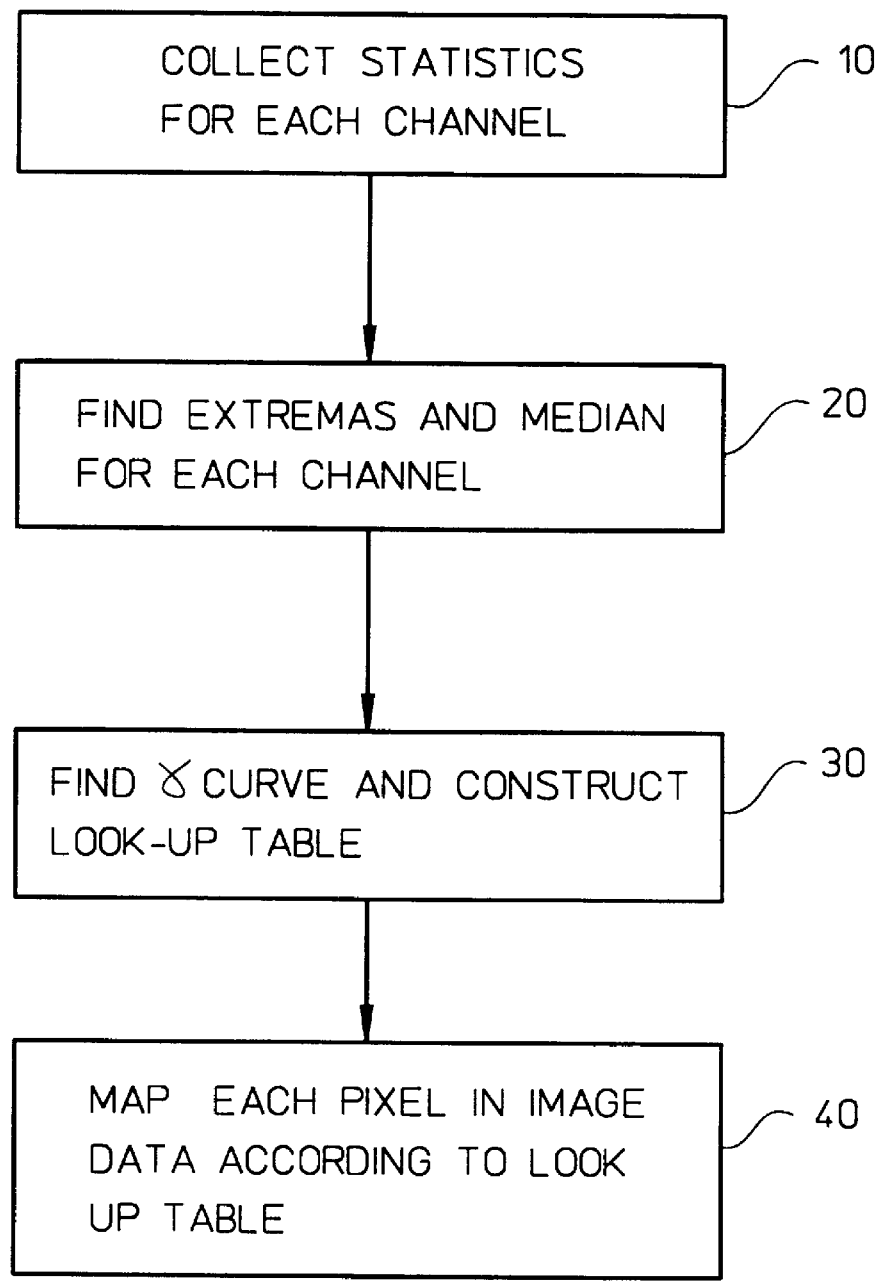
FIG. 2 illustrates a process flowchart of a digital color processing method implemented by the system shown in FIG. 1.

FIG. 2 illustrates a process flowchart of a digital color processing method implemented by the digital processor shown in FIG. 1. In step 10, the statistics of each channel is collected. In step 20, the extremas and median point for each channel is determined. The extremas determine the hue shift needed for each channel while the median point will be used to correct the exposure. The minimum hues for each channel when combined define the darkest point of the image while a combination of the maximum hues define the lightest. In step 30, a gamma curve fit is performed and an optional look-up table is generated according to the gamma curve. The gamma curve maps the minimum extrema to "black" and the maximum extrema to "white". The median point is shifted to approximately 50% gray level, the halfway point between "black" and "white". In step 40, each pixel of the image data is mapped according to the look-up table or transfer function.

Figures 3A, 3B, 6:
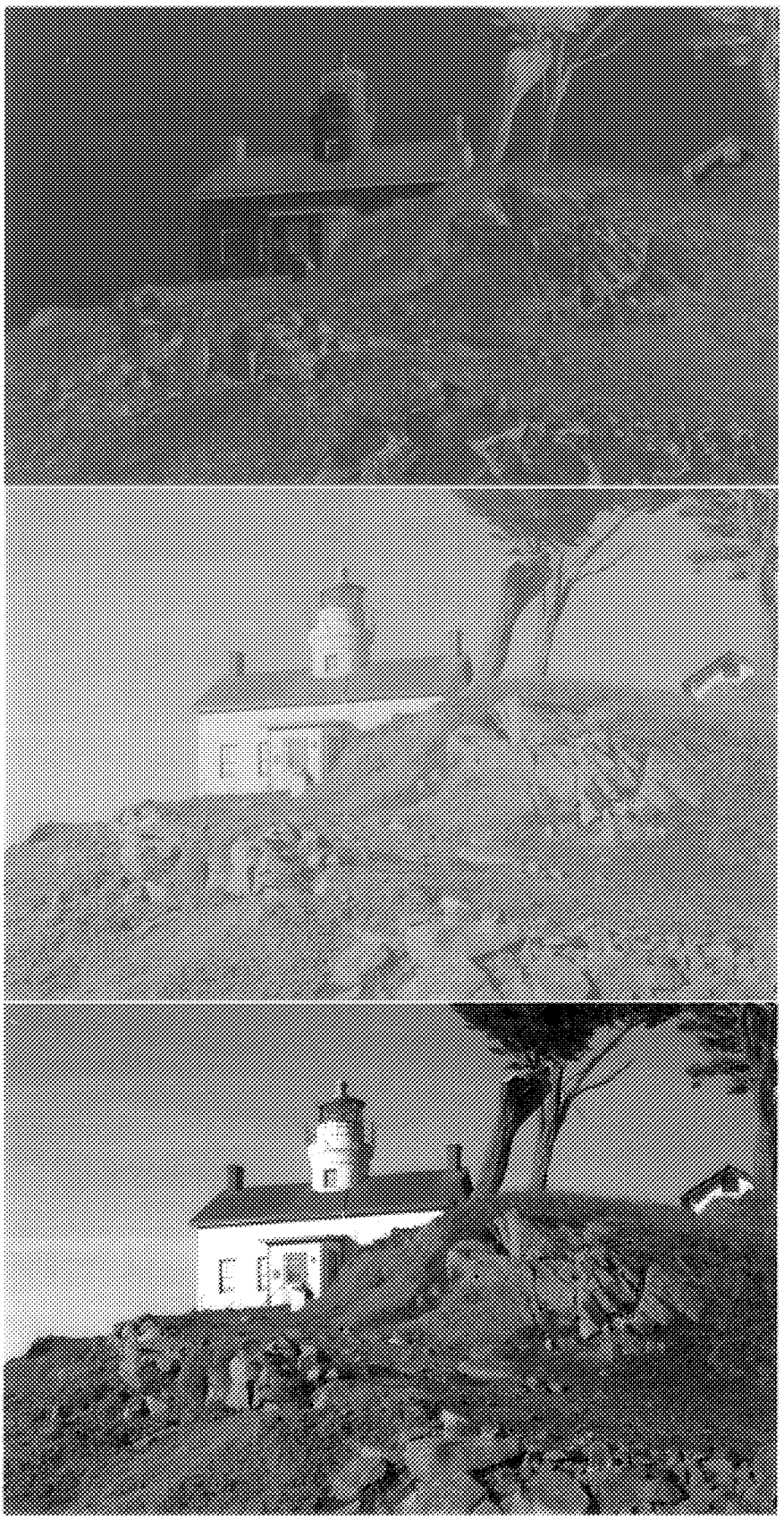
FIGS. 3A and 3B shows a scanned image.
FIG. 6 illustrates the corrected image.

FIGS. 3A and 3B shows a scanned image. FIG. 3A shows the scanned image in inverted while FIG. 3B shows the scanned image uninverted.

Figure 4:
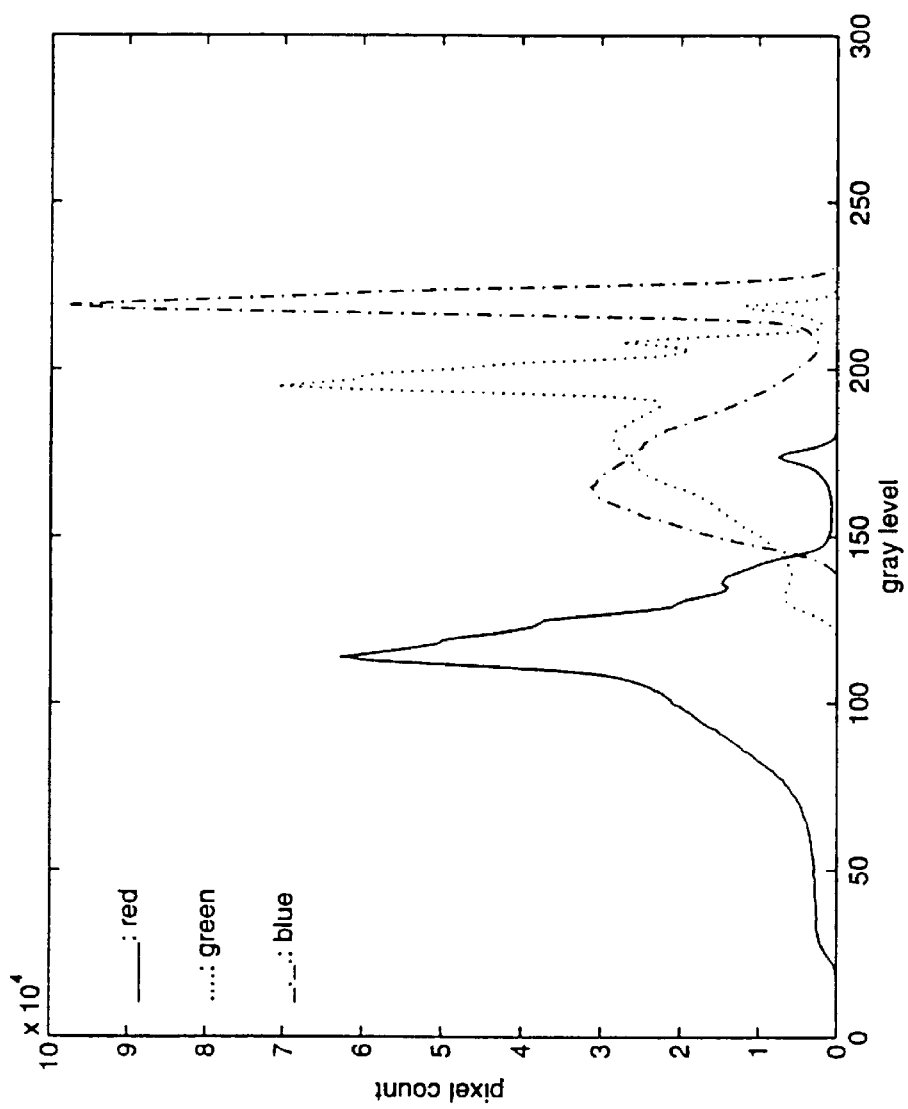
FIG. 4 illustrates histograms of the image in FIG. 3.

FIG. 4 illustrates histograms of the image in FIG. 3 as applied in RGB space.

The RGB histograms are very different from another. The image has a significant amount of blue component, but not much red and green components. Hence, as shown in FIG. 3B, the image is predominantly blue. To correct for the blue cast, each color component of the histogram will be expanded in spectral frequency in step 30.

Suppose the red component histogram has non-zero values between gray levels $R_{min}$ and $R_{max}$. In Equation 1, the normalized red component $R_{norm}$ after mapping is determined as follows:

$$R_{norm} = \frac{R_{old} - R_{min}}{R_{max} - R_{min}} \tag{1}$$

where the $R_{old}$ is the red component before mapping. The new green and blue components are calculated in a similar way. In practice, to reduce the effect of noise, the maximum and minimum of each color component are chosen as the points where the cumulative histogram reaches a certain level, for example, 99.5% and 0.5% respectively.

The underlying assumption of stretching the histogram is that the point ($R_{max}$, $G_{max}$, and $B_{max}$) corresponds to the white point of the image, and should be rendered as white in the RGB device space of a printer or a monitor. Similarly, the point ($R_{min}$, $G_{min}$, and $B_{min}$) corresponds to the black point of the image, and should be rendered as black in the RGB device space of a printer or a monitor. From most of the natural image, there exists highlight and shadow areas that need to be rendered as white and black respectively. Hence, the assumption that ($R_{max}$, $G_{max}$, and $B_{max}$) is the white point and ($R_{min}$, $G_{min}$, and $B_{min}$) is the black point is valid for most natural images. If a 3-dimensional view with the RGB channels as the axes is considered, then step 20 corresponds to finding a bounding box that encloses the image data.

The above procedure ensures that white will be represented by white and black will be represented as black on a monitor or a printer. It ensures that there is no hue shift in the processed image. However, the image may still be too bright or too dark, i.e. the exposure level may be incorrect.

FIG. 4 illustrates a cumulative gray level histogram for the image shown in FIG. 3. As described in step 20, a median point has been defined for each channel. As describe in step 30, which corrects for the exposure, a gamma curve that defines the degree of correction for the red channel is identified. For each channel, the median point where half of the pixels have gray levels below it and half have levels above it is identified.

In this embodiment, as shown in Equation 2, the gamma value is found as follows:

$$\gamma_R = \frac{\log(0.4)}{\log \frac{R_{med} - R_{min}}{R_{max} - R_{min}}} \quad (2)$$

Step 30 is repeated to find the corresponding gammas for the green and blue components, $\gamma_G$ and $\gamma_B$, respectively. As shown in Equation 3, the final gamma $\gamma$ used is the average gamma for the RGB channels:

$$\gamma = \frac{(\gamma_R + \gamma_G + \gamma_B)}{3} \quad (3)$$

The number 0.4 is a user defined parameter that effects the brightness when the image is produced. A larger value results in a lighter image. The criteria is that processed images should have a good brightness and contrast on the monitor and printer. However, once chosen, this value is used to process all images.

As described in step 40, each pixel of the image data is mapped according to the gamma curve for each channel. The mapping used in this embodiment is described in equation 4. The new red component $R_{new}$ is:

$$R_{new} = 255 * R^\gamma_{norm} \quad (4)$$

Green and blue components are calculated similarly.

That is, a curve fit is performed for each histogram from the new maxima, minima, and median.

FIG. 6 illustrates the corrected image.

Figure 7:
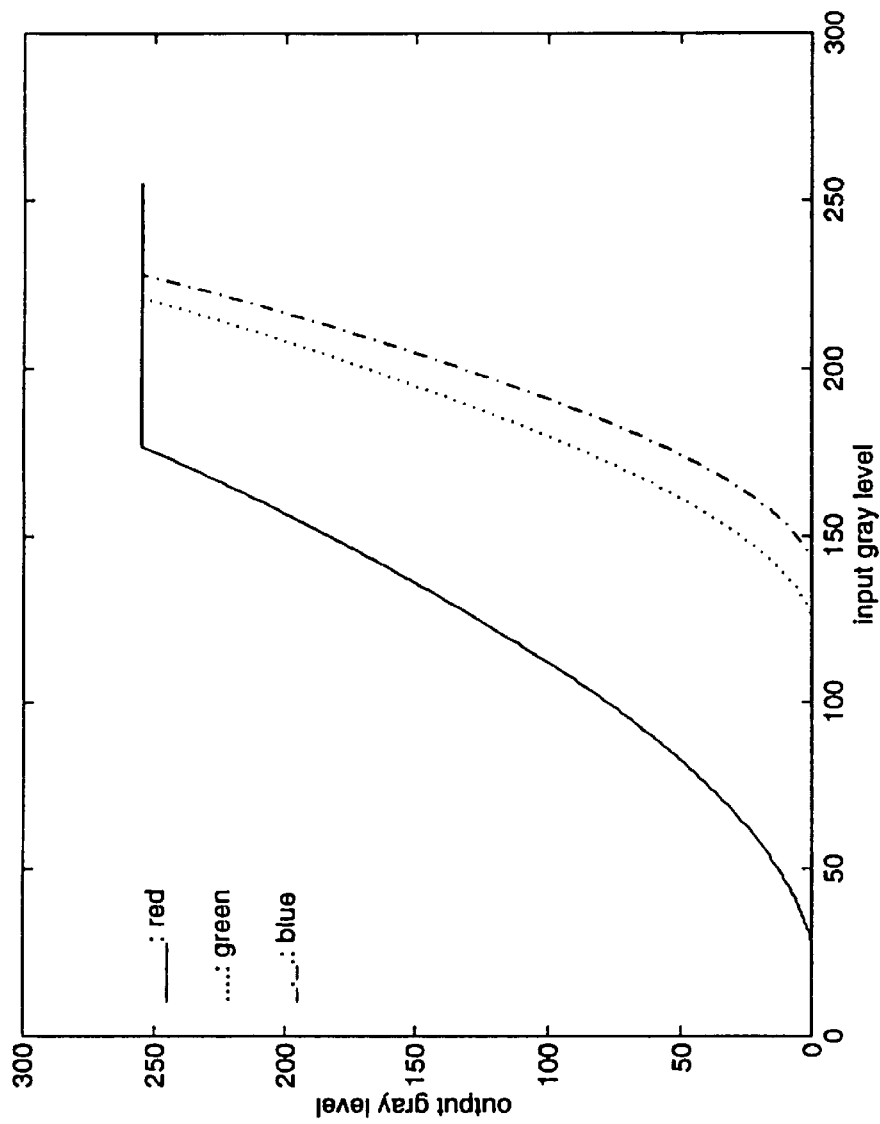
FIG. 7 is an embodiment of the look-up table.

FIG. 7 is an embodiment of the look-up table. The look-up table can be constructed from the highlight, shadow, and gamma parameters for each of the RGB channels.

Figure 5:
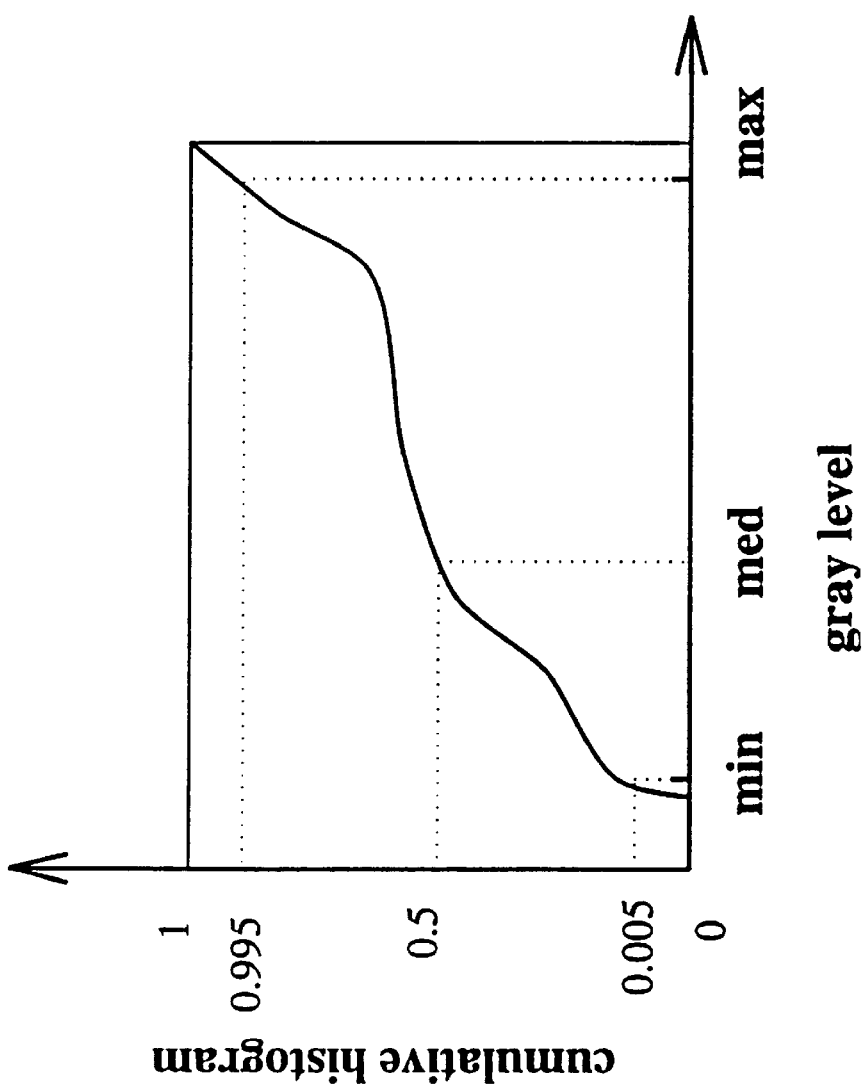
FIG. 5 illustrates a cumulative gray level histogram of the image in FIG. 3.
Figure 8:
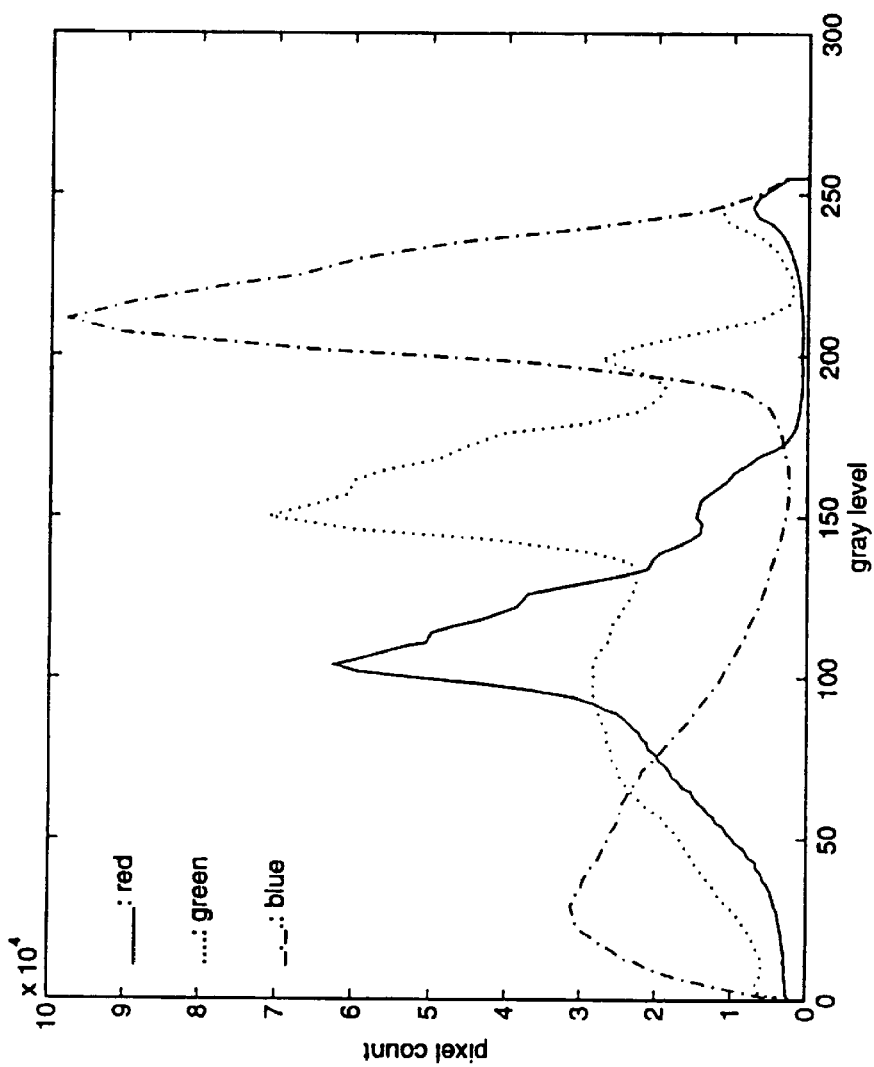
FIG. 8 illustrates the histogram of the corrected image shown in FIG. 5.

FIG. 8 illustrates the histogram of the corrected image shown in FIG. 5.

I claim:

1. A digital color processing method for image data points from scanners and digital cameras for each channel, comprising the steps of:

gathering image pixels;

determining a first difference between a light intensity minima "BLACK" and maxima "WHITE";

determining a second difference between the image data pixel and the light intensity minima for the channel;

determining a normalized image data pixel that is a ratio of the first and second differences, correcting exposure of the image pixels;

mapping each normalized image pixel according to the exposure; and imprint the mapped normalized image pixel.

2. A digital color processing method for image data, as defined in claim 1, wherein the step of correcting exposure includes the steps of:

for each channel, determining a first difference between the light intensity minima and maxima;

for each channel, determining a second difference between the light intensity of the data median point and the light intensity minima;

selecting a desired brightness for the normalized image pixels;

for each channel, defining a gamma curve that reflects the desired brightness, the first difference, and the second difference;

averaging the gamma curves of each channel to determine a gamma curve.

3. A digital color processing method for image data, as defined in claim 2, wherein the step of correcting exposure further includes constructing a look-up table according to the gamma curve.

4. A digital color processing method for image data, as defined in claim 2, wherein the step of correcting exposure includes determining a transfer function according to the gamma curve.

5. A digital color processing method for image data, as defined in claim 2, wherein the step of mapping each normalized image pixel translates the normalized image pixel according to the gamma curve.

6. A digital color processing method for image data, as defined in claim 1, wherein the step of correcting exposure includes the steps of:

for each channel, determining a first difference between the light intensity minima and maxima;

for each channel, determining a second difference between the light intensity of the data median point and the light intensity minima;

selecting a desired brightness;

for each channel, defining a gamma curve that reflects the desired brightness, the first difference, and the second difference; and averaging the gamma curves of each channel to determine the gamma curve.

7. A digital color processing method for image data, as defined in claim 6, wherein the step of correcting exposure further includes constructing a look-up table according to the gamma curve.

8. A digital color processing method for image data, as defined in claim 6, wherein the step of correcting exposure includes determining a transfer function according to the gamma curve.

9. A digital color processing method for image data, as defined in claim 6, wherein the step of mapping each normalized image pixel translates the normalized image pixel according to the gamma curve.

* * * * *